(12) United States Patent
Tsai

(10) Patent No.: US 6,695,266 B1
(45) Date of Patent: Feb. 24, 2004

(54) INTERNAL TELESCOPIC STAND FOR INANIMATE OBJECTS

(76) Inventor: Chih-Cheng Tsai, No. 13, Chung Hwa Rd., Lin Lo Village, Lin Lo Hsiang, Pingtung Hsien (TW)

( * ) Notice: Subject to any disclaimer, the term of this patent is extended or adjusted under 35 U.S.C. 154(b) by 0 days.

(21) Appl. No.: 10/429,688

(22) Filed: May 5, 2003

(51) Int. Cl.[7] .............................................. F16M 13/00
(52) U.S. Cl. ............................... 248/125.8; 40/607.04; 40/611.11
(58) Field of Search .......................... 248/125.8, 125.1, 248/125.2, 161; 40/607.04, 607.1, 610, 611.11

(56) References Cited

U.S. PATENT DOCUMENTS

| | | | | |
|---|---|---|---|---|
| 5,911,523 A | * | 6/1999 | Burchart | 40/406 |
| 2002/0174582 A1 | * | 11/2002 | Garfinkle et al. | 40/606 |
| 2003/0173472 A1 | * | 9/2003 | Liu | 248/125.2 |

* cited by examiner

Primary Examiner—Leslie A. Braun
Assistant Examiner—Kofi Schulterbrandt
(74) Attorney, Agent, or Firm—William E. Pelton, Esq.

(57) ABSTRACT

An internal telescopic stand mounted inside an inanimate object to support the inanimate object includes a top bracket assembly, a medial bracket assembly, a base assembly, an upper spring-loaded telescopic tube assembly and multiple lower spring-loaded telescopic tube assemblies. The telescopic tube assemblies connect the top bracket assembly, the medial bracket assembly and the base assembly together. Each telescopic tube assembly has spring-loaded telescopic tubes that can be overlapped to allow the internal telescopic stand to be variable in height between an extended position and a retracted position. In addition, the top bracket has two pivotal hooks. The medial bracket assembly has two sliding locks. The pivotal hooks will lock the sliding locks when the internal telescopic stand is adequately retracted to hold the internal telescopic stand in a retracted position.

7 Claims, 11 Drawing Sheets

INTERNAL TELESCOPIC STAND FOR INANIMATE OBJECTS

BACKGROUND OF THE INVENTION

1. Field of the Invention

The present invention relates to a telescopic stand for inanimate objects, and more particularly to an internal telescopic stand that can be shortened to conveniently store or transport inanimate objects.

2. Description of Related Art

Inanimate objects are used extensively in commercial promotions, decorative applications or celebrations. The inanimate objects can be in the form of large inanimate figures of people, such as Santa Claus, leprechauns, the Easter Bunny, etc., or large decorative objects, such as Christmas trees, national monuments, etc. The inanimate objects today are animated to sing, dance or swing to attract people's attention. Various actuating devices are built or mounted inside the inanimate objects to achieve the designed animation. Therefore, the inanimate objects are often bulky and occupy a large space such that storing and transporting the inanimate objects is inconvenient.

With reference to FIGS. 10 and 11, an internal telescopic stand in accordance with the prior art inside an inanimate object (not numbered) comprises a top bracket (41), a medial bracket (42), a base (43), multiple telescopic tubes (44) and multiple lock assemblies (not numbered). The base (43) has a top surface (not numbered) and two foundation blocks (not numbered) that are rectangular parallelepipeds, are mounted parallel to each other on the top surface of the base (43) and have top surfaces (not numbered).

The telescopic tubes (44), are spring-loaded inside are respectively mounted between the top bracket (41) and the medial bracket (42) and the medial bracket (42) and the two foundation blocks. Each telescopic tube (44) has an inner tube (441) and an outer tube (442). The inner tube (441) is retractably mounted in the outer tube (442).

The lock assemblies are respectively mounted between the two brackets (41, 42) and the medial bracket (42) and the base (43) and comprise lock rods (451) and lock sockets (452). The lock rods (451) protrude down respectively from the top and the medial brackets (41, 42), and each lock rod (451) has a locking stub (not numbered) extending radially from the lock rod (451). The lock sockets (452) are defined respectively in the tops of the medial bracket (42) and the foundation blocks, correspond to the lock rods (451) and have internal locking slots (not shown) corresponding to the locking stubs.

When the inner tubes (441) of the telescopic tubes (44) retract into the outer tubes (442), the locking stubs on the lock rods (451) are drawn respectively into the lock sockets (452) and engage the locking slots in the locking sockets (452) to hold the inanimate object in a retracted state. Therefore, the inanimate objects will occupy a reduced volume so the inanimate objects can be conveniently stored or transported.

However, the conventional telescopic stand can only be shortened to the extend that the telescopic tubes (44) can be shortened with the inner tubes (441) retracting into the outer tubes (442). Consequently, a conventional telescopic stand has a minimum height equal to a sum of the thicknesses of the two brackets (41, 42), the base (43) and a foundation block and the lengths of an outer tube (442) between the foundation block and the medial bracket (42) and the two brackets (42, 41). Further reducing the minimum height of the telescopic stand will make storing or transporting the inanimate object more convenient.

When the telescopic tubes (44) are extended to support an inanimate object, the conventional telescopic stand does not have any features to hold the extended telescopic tubes (44) in position. Since the telescopic tubes (44) are spring-loaded to keep the telescopic tubes (44) in a extended state, a heavy weight of the inanimate object will compress the extended telescopic tubes (44) such that the inanimate object cannot be held stably in an extended state.

To overcome the shortcomings, the present invention provides an internal telescopic stand for an inanimate object to mitigate or obviate the aforementioned problems.

SUMMARY OF THE INVENTION

The main objective of the invention is to provide an internal telescopic stand for an inanimate object that can be shortened to a retracted position such that the inanimate object can be conveniently stored or transported.

Other objectives, advantages and novel features of the invention will become more apparent from the following detailed description when taken in conjunction with the accompanying drawings.

DETAILED DESCRIPTION OF PREFERRED EMBODIMENT

Figure 1:
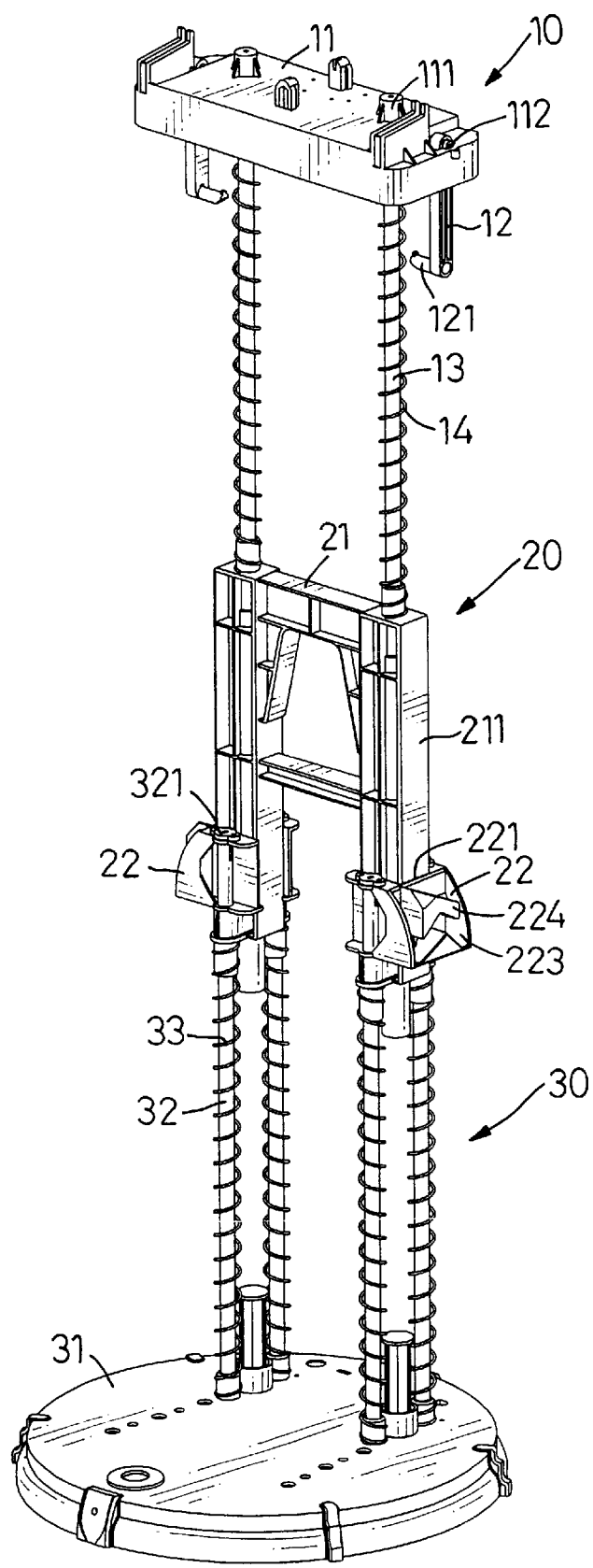
FIG. 1 is a perspective view of an internal telescopic stand in accordance with the present invention.
Figure 2:
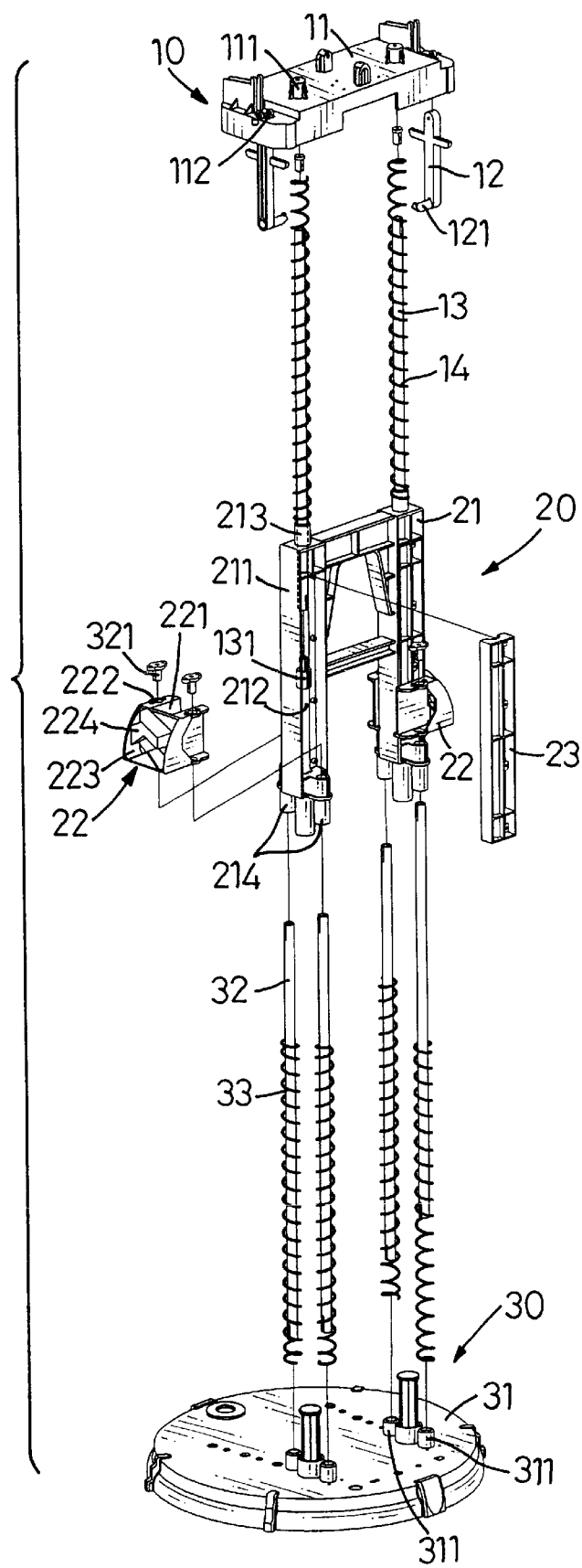
FIG. 2 is an exploded perspective view of the internal telescopic stand in FIG. 1.

With reference to FIGS. 1 and 2, an internal telescopic stand for an inanimate object (not shown) comprises a top bracket assembly (10), a medial bracket assembly (20), a base assembly (30), an upper spring-loaded telescopic tube assembly (not numbered) and multiple lower spring-loaded telescopic tube assemblies (not numbered). The spring-loaded telescopic tube assemblies connect the top bracket assembly (10), the medial bracket assembly (20) and the base assembly (30) together.

The top bracket assembly (10) is used to support a head (not shown) or a top (not shown) of an inanimate object and comprises a top bracket (11) and two pivotal lock rods (12). The top bracket (11) has a top (not numbered), a bottom (not numbered), two opposite ends (not numbered), two top end caps (111) and two pivot slots (112). The two top end caps (111) are formed on the top of the top bracket (11), and each top end cap (111) has an axial hole (not numbered) formed through the bottom of the top bracket (11). The pivot slots (112) are defined from the top to the bottom respectively at the ends of the top bracket (11). The pivotal lock rods (12) are pivotally mounted respectively in the pivot slots (112), and each pivotal lock rod (112) has a bottom end (not numbered) and a latch (121). The latches (121) are formed at and are perpendicular to the bottom ends and face each other.

Figure 3:
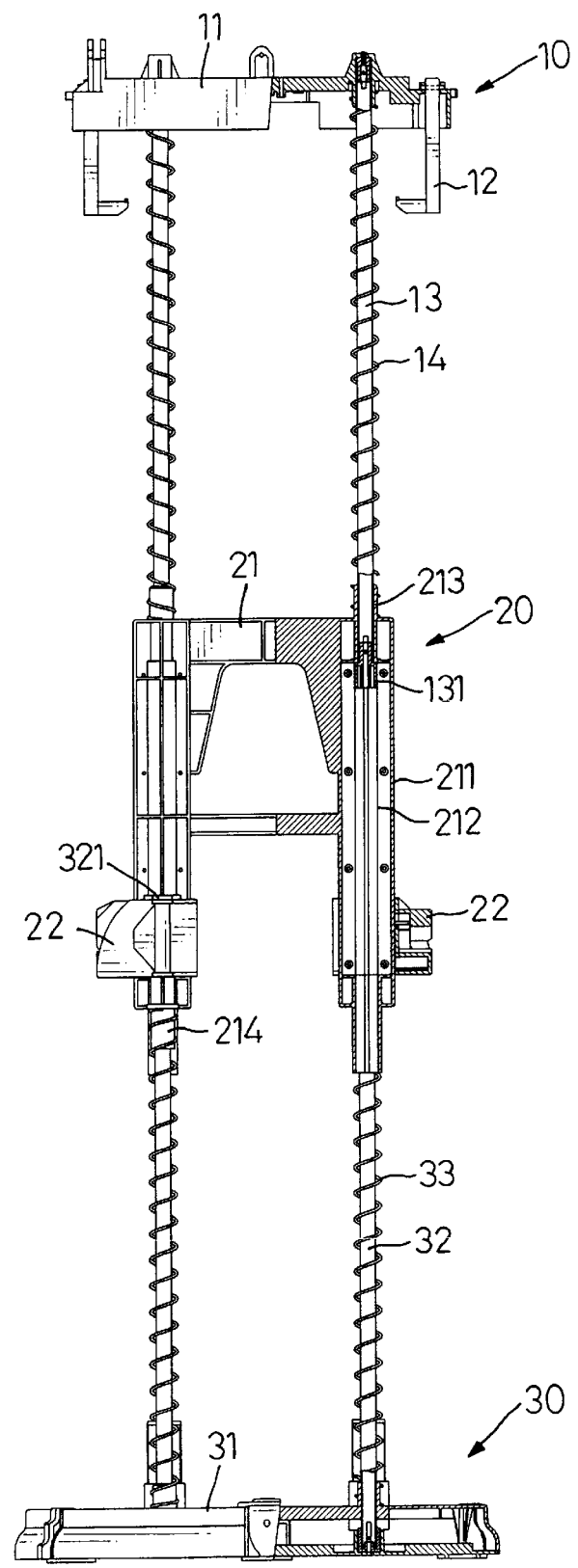
FIG. 3 is a front plan view in partial section of the internal telescopic stand in FIG. 1.
Figure 4:
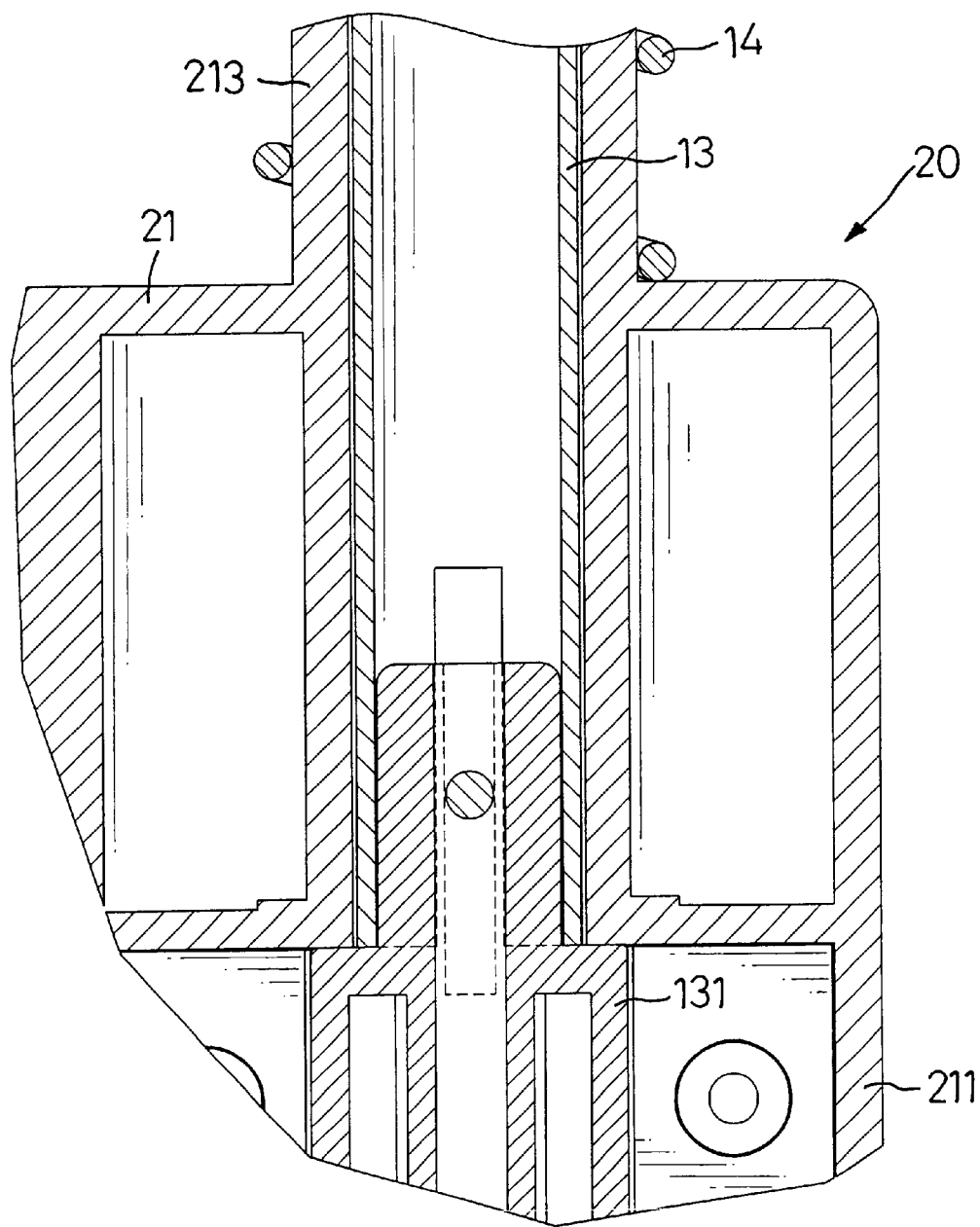
FIG. 4 is an enlarged cross sectional front plan view of a portion of the internal telescopic stand in FIG. 3.
Figure 5:
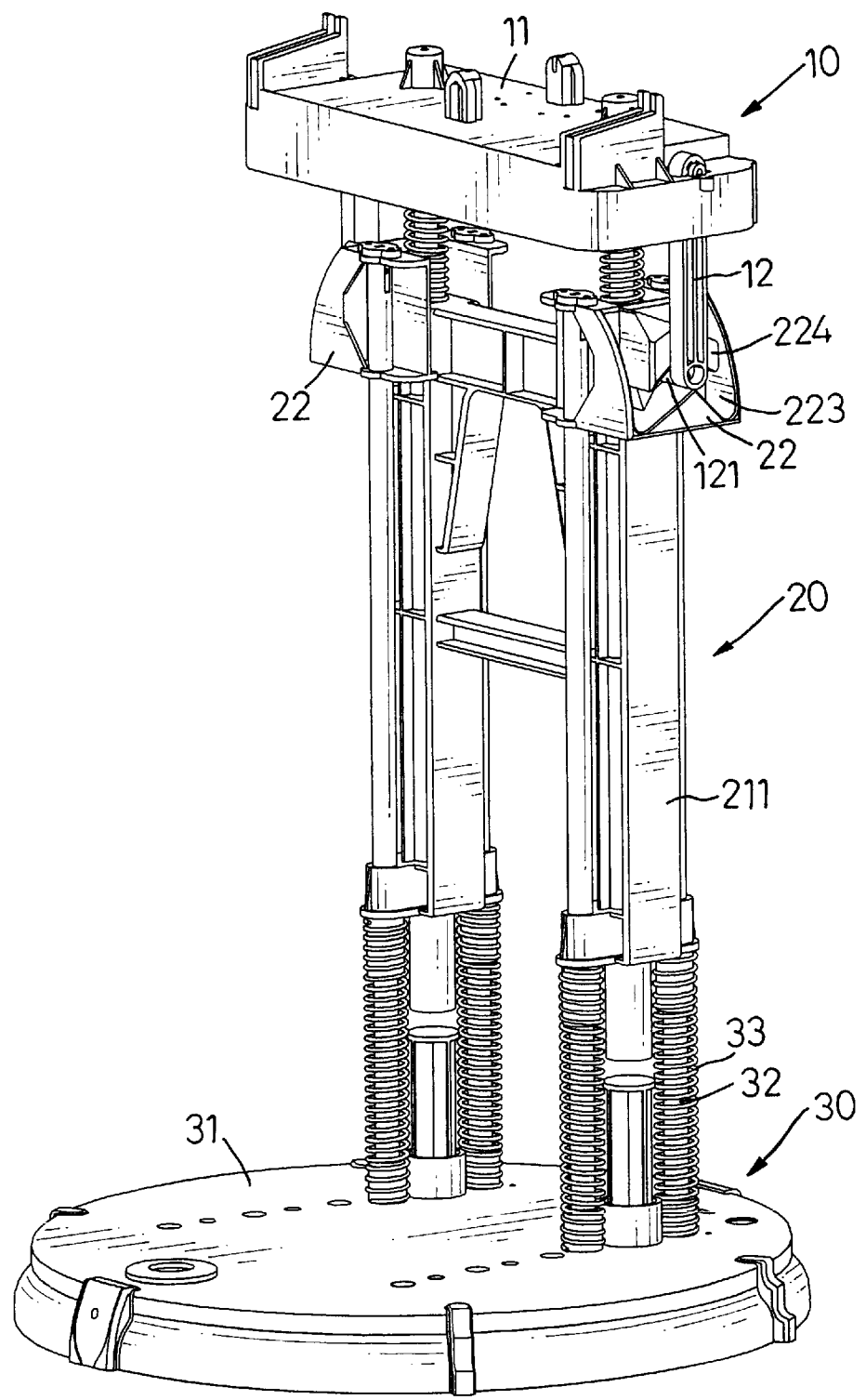
FIG. 5 is a perspective view of the internal telescopic stand in FIG. 1 in a shortened configuration.
Figure 6:
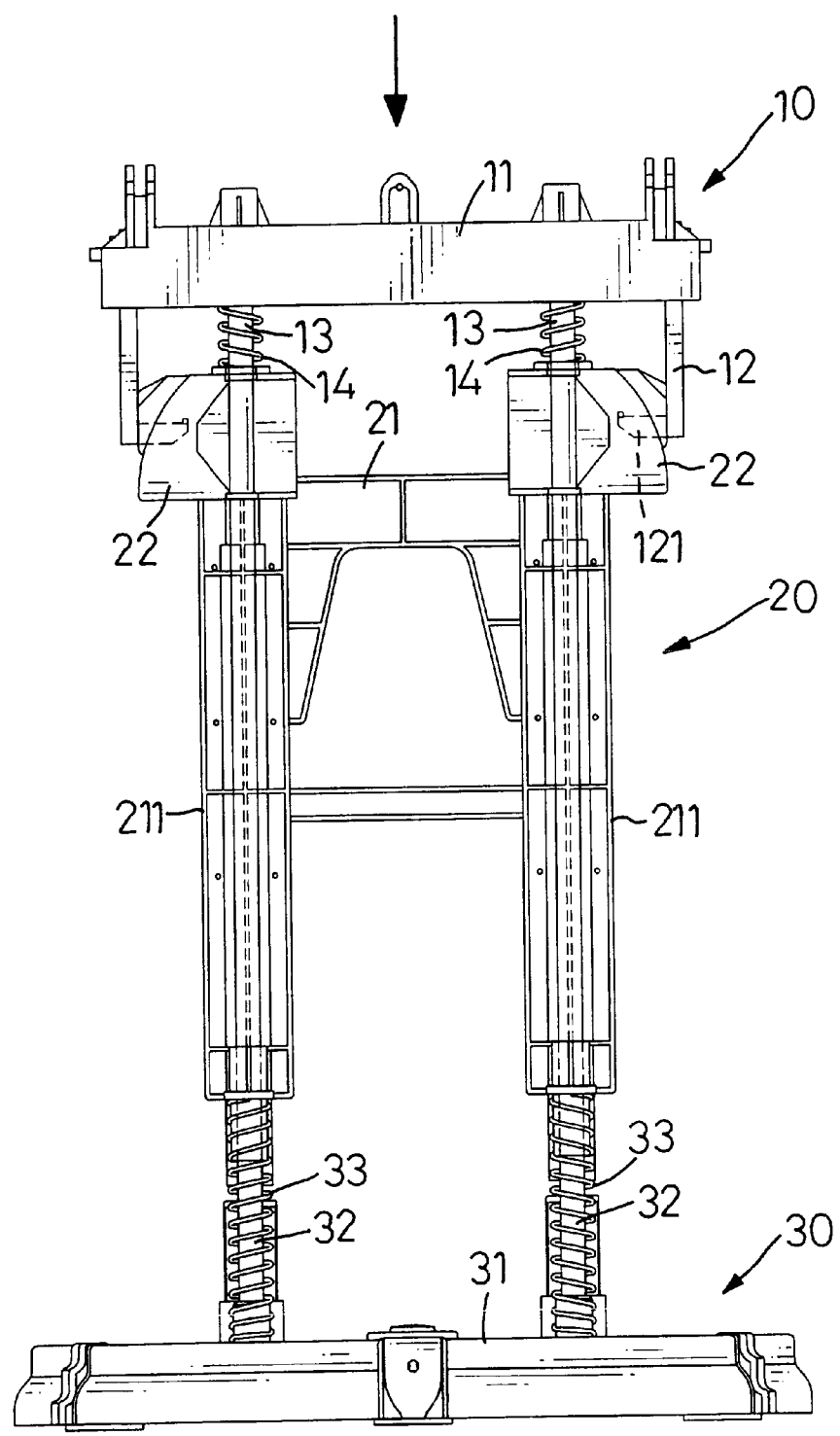
FIG. 6 is a front plan view of the internal telescopic stand in FIG. 5.
Figure 7:
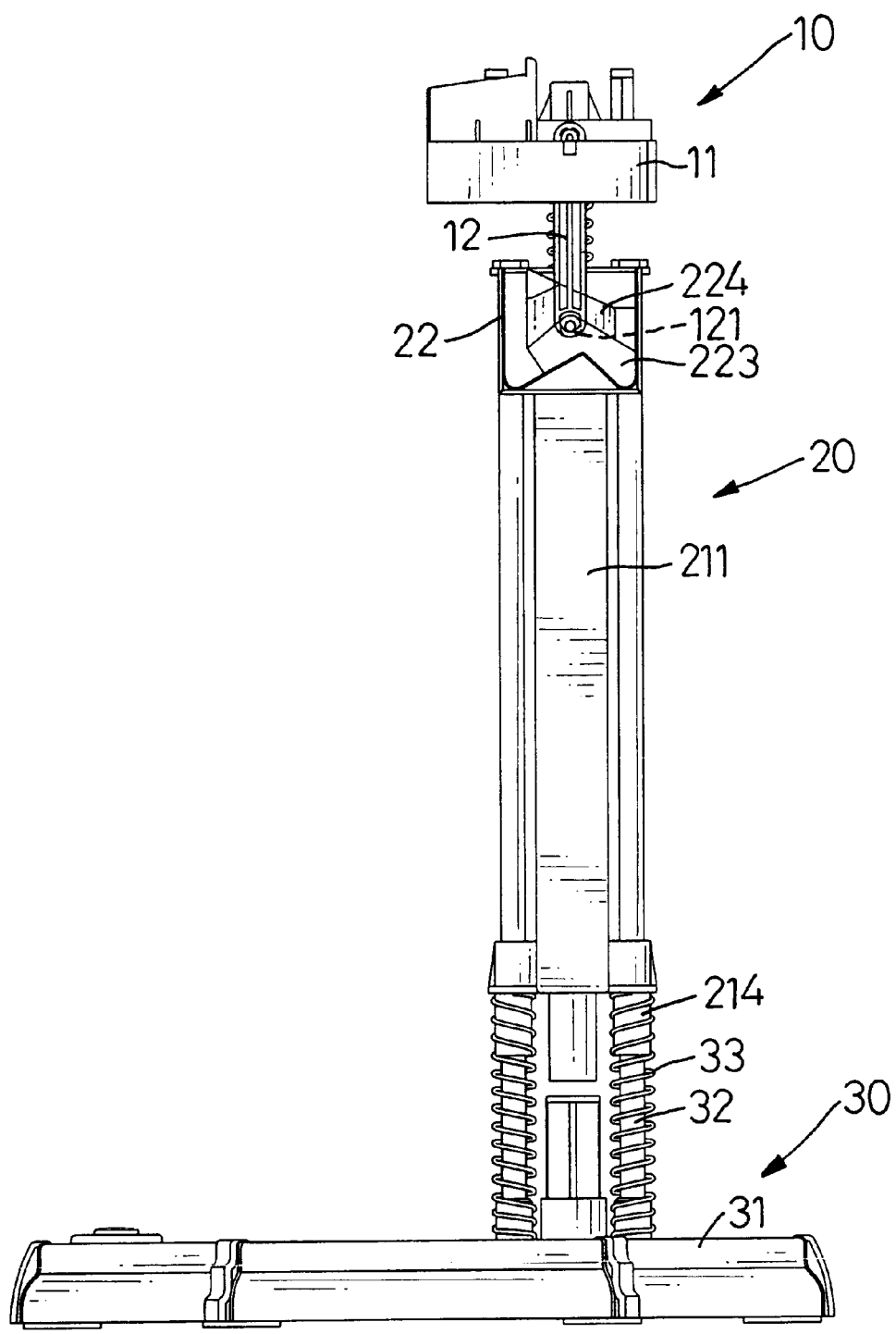
FIG. 7 is a side plan view of the internal telescopic stand in FIG. 5.

With further reference to FIGS. 3 and 4, the upper spring-loaded telescopic tube assembly (not numbered) comprises two upper telescopic tubes (13), two upper coil springs (14) and two end plugs (131) and supports the head assembly (10). Each of the upper telescopic tubes (13) has a top, end (not numbered), a bottom end (not numbered) and an end plug (131). The top ends of the upper telescopic tubes (13) are mounted and held respectively in the axial holes in the bottom of the top bracket (11) under the top end caps (111). The end plugs (131) are enlarged and are mounted respectively on the bottom ends of the upper telescopic tubes (13) that are mounted slidably in the medial bracket assembly (20). The upper coil springs (14) are mounted respectively around the upper telescopic tubes (13) to extend the upper spring-loaded telescopic tubes (13).

The medial bracket assembly (20) comprises a U-shaped medial bracket (21) and two sliding locks (22) The U-shaped medial bracket (21) has an upper cross member (not numbered), a medial cross member (not numbered), two longitudinal arms (211), two upper sleeves (213) and two pairs of lower sleeves (214). The upper cross member has two ends (not numbered). The medial cross member has two ends (not numbered). Each longitudinal arm (211) has an upper end (not numbered), a bottom end (not numbered), an inner passage (212) and a passage cover (23). The ends of the upper cross member are attached respectively to the upper ends of the longitudinal arms (211), and the ends of the medial cross member are attached to the longitudinal arms (211) below the upper cross member. The inner passages (212) are longitudinally defined respectively through the longitudinal arms (211). The upper sleeves (213) are hollow cylinders and are mounted respectively on the upper ends of the longitudinal arms (211) and communicate respectively with the inner passages (212). The bottom ends of the upper telescopic tubes (13) pass respectively through the upper sleeves (213) and extend into the inner passages (212). The end plugs (131) are attached respectively to the bottom ends of the upper telescopic tubes (13) and hold the bottom ends inside the inner passage (212) in the longitudinal arms (211). The passage covers (23) are mounted respectively on the longitudinal arms (211) to enclose the inner passages (213). The two pairs of hollow cylindrical lower sleeves (214) are mounted respectively at the bottom ends of the longitudinal arms (211) with one lower sleeve (214) on the front and the other on the rear of each longitudinal arm (211).

The sliding locks (22) are U-shaped, and each sliding lock (22) has an internal longitudinal recess (221), a top (not numbered), a bottom (not numbered), a front (not numbered), a rear (not numbered), an outside recess (not numbered), upper and lower flanges (not numbered) and a locking arm (224). The internal longitudinal recesses (221) are slidably mounted respectively on the longitudinal arms (211). Two upper and lower flanges transversally protrude respectively from the top and bottom of the front and the rear of each sliding lock (22). The upper and lower flanges respectively have through holes (222) aligned with each other and the lower sleeves (214) mounted on the longitudinal arms (211). The locking arms (224) are curved upward and are formed respectively in the outside recesses of each sliding lock (22) to form curved upward latch slots (223) through which the latches (121) can pass to engage or disengage from the locking arms (224).

The bottom telescopic tube assemblies comprise four lower telescopic tubes (32), four lower coil springs (33) and four fastening plugs (321). Each lower telescopic tube (32) has a top end (not numbered) and a bottom end (not numbered). The top ends of the lower telescopic tubes (32) pass respectively through and extend out of the lower sleeves (214) and the aligned through holes (222) and extend through the top of the sliding lock (22). The fastening plugs (321) have enlarged heads (not numbered) and are pressed respectively onto the top ends of the lower telescopic tubes (32) and into the corresponding through holes (222) in the sliding lock (22) to securely attach the sliding lock (22) to the top ends of the lower telescopic tubes (32). The lower coil springs (33) are mounted respectively around the lower telescopic tubes (32) between the lower sleeves (214) and the base assembly (30).

The base assembly (30) comprises a base disc (31) and multiple mounting sleeves (311). The base disc (31) has a top (nor numbered) and a bottom (not numbered), and the mounting sleeves (311) are respectively formed on the top of the base disc (31) and correspond to the lower telescopic tubes (32) to securely hold the bottom ends of the lower telescopic tubes (32) and the lower coil springs (33) on the base disk (31).

With reference to FIGS. 1 and 5 to 7, the internal telescopic stand is shortened by pressing the top bracket (11) downward, which presses the upper telescopic tubes (13) into the inner passages (212) through the upper sleeves (213) and simultaneously compresses the upper coil springs (14). Compressing the upper coil springs (14) create's a restitution force on the top bracket (11). Continuing to press the top bracket (11) downward pushes the medial bracket (21) down on the lower telescopic tubes (32) so the top bracket (11) approaches the sliding locks (22) on the top ends of the lower telescopic tubes (32). As the top bracket approaches the sliding locks (22), the latches (121) slide respectively through the latch slots (223) and engage the locking arms (224) such that the internal telescopic stand is retained in a retracted position.

Figure 8:
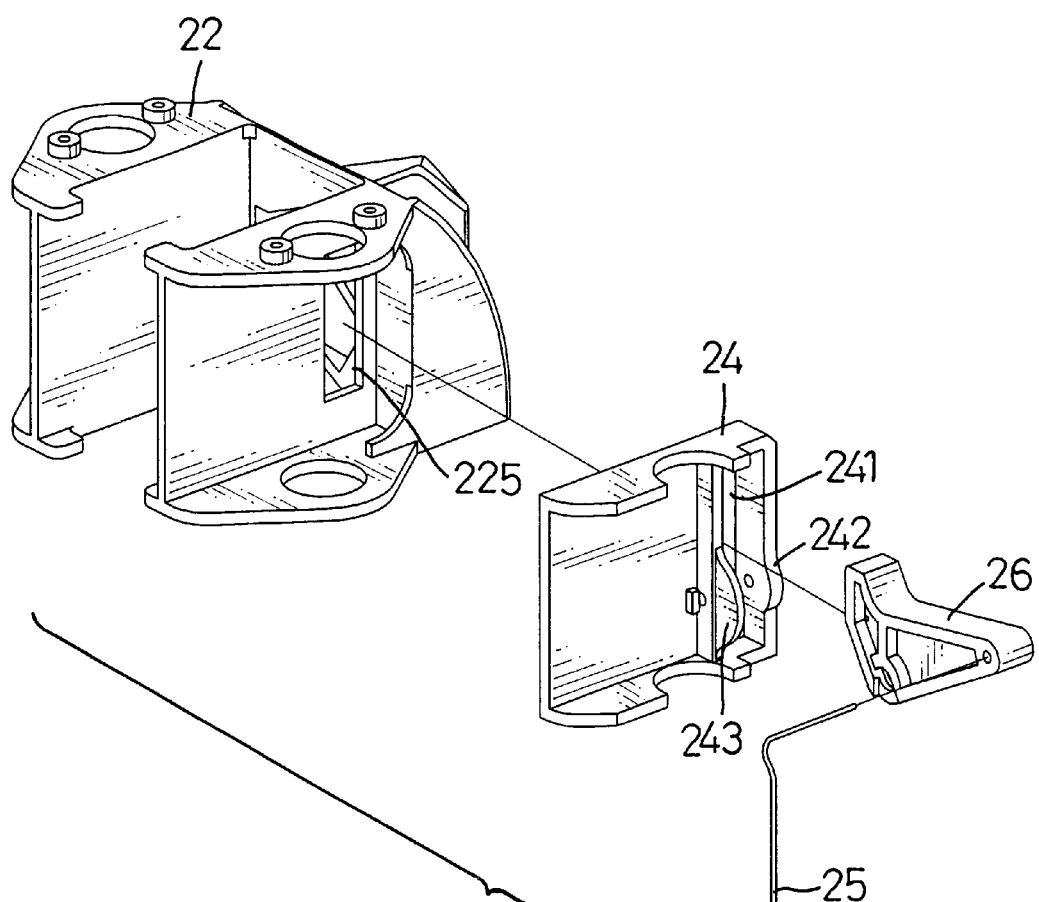
FIG. 8 is an exploded perspective view of a second embodiment of a sliding lock for the internal telescopic stand in accordance with the present invention.
Figure 9:
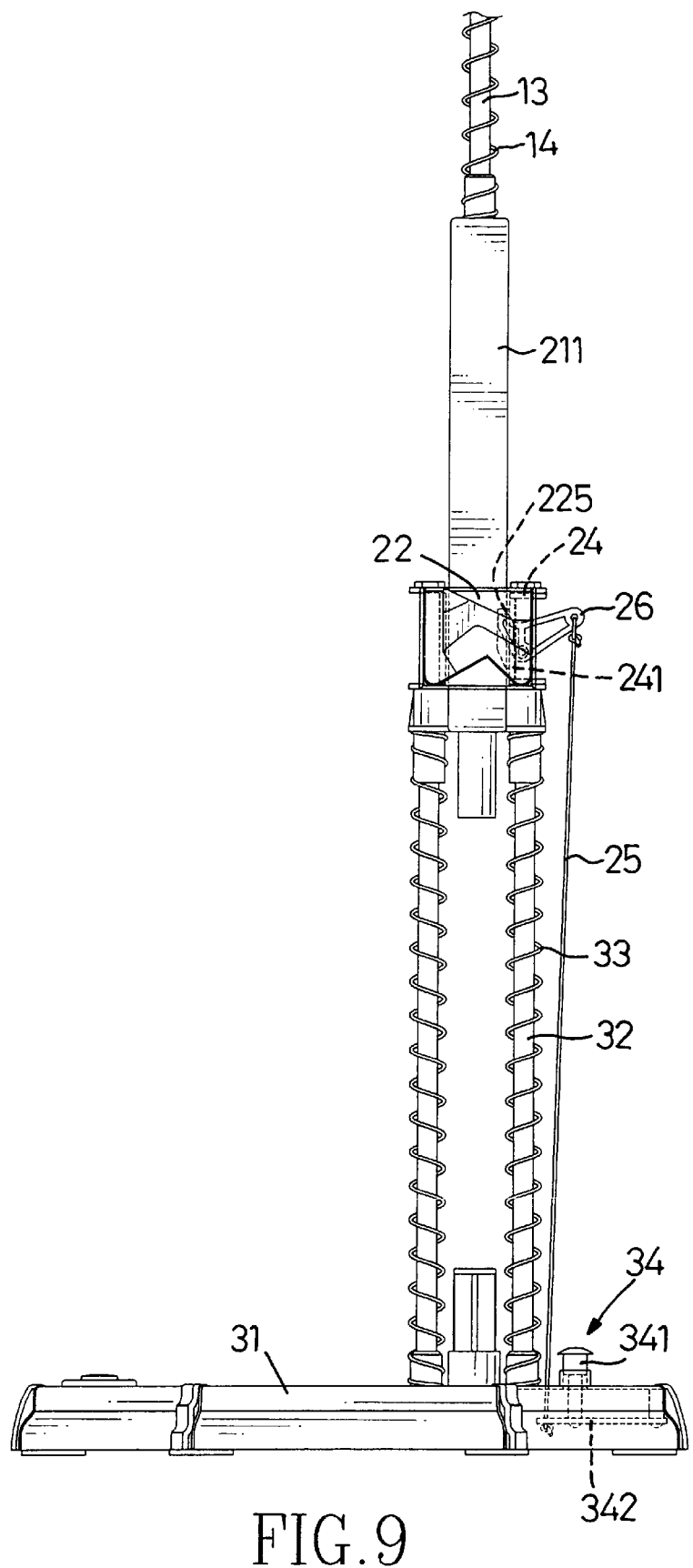
FIG. 9 is side plan view of a second embodiment of the internal telescopic stand in accordance with the present invention with the sliding lock in FIG. 8.
Figure 10:
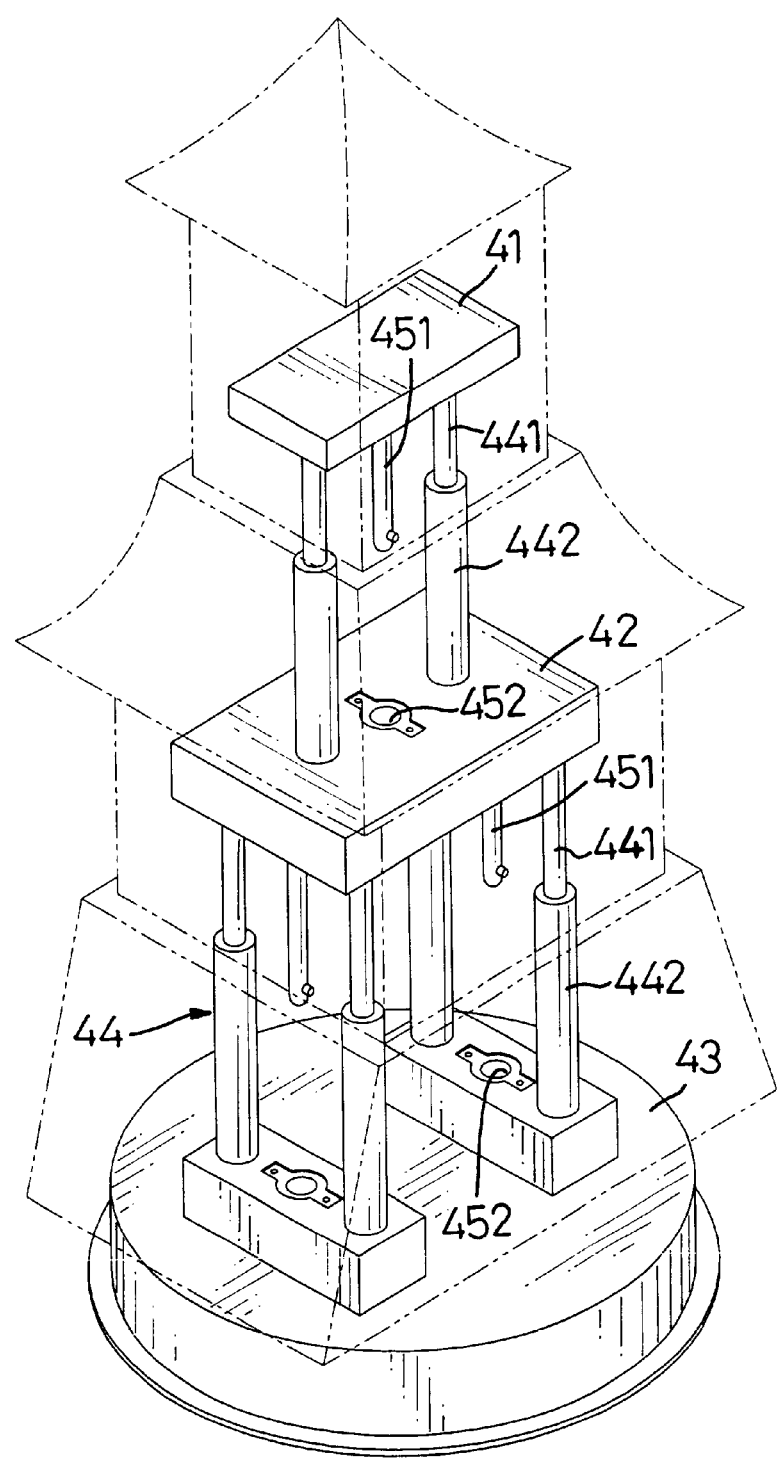
FIG. 10 is a perspective view of a conventional internal telescopic stand in accordance with the prior art.
Figure 11:
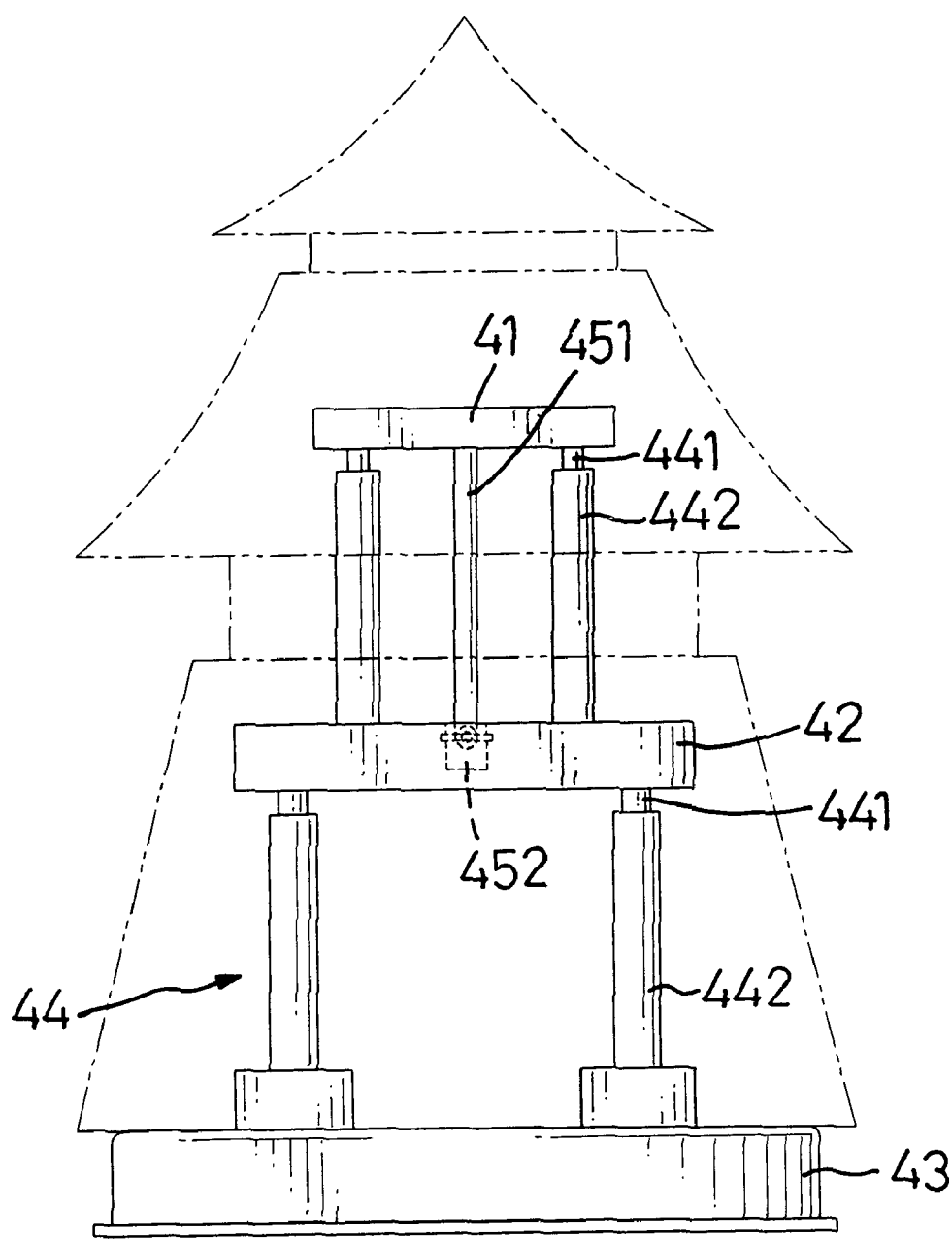
FIG. 11 is a front plan view of the internal telescopic stand in FIG. 10 in a shortened configuration.

With reference to FIGS. 1, 8 and 9, another embodiment of the internal telescopic stand in accordance with present invention further comprises an extension lock (not numbered), a connecting cord (25) and a release pedal device (34) to hold the internal telescopic stand in an extended position and selectively release the internal telescopic stand. The extension lock is mounted in one of the sliding locks (22) that further has a through hole (225) defined through the rear of the sliding lock (22). Furthermore, the longitudinal arm (211) further has a lock recess (not numbered) that corresponds to the through hole (225) in the sliding lock (22). The extension lock has a pivotal latch (26) and a latch bracket (24) that has a through hole (241) aligned with the through hole (225) in the sliding lock (22), a sidewall (242) and a wing (243). The wing (243) is parallel to the sidewall (242), and the pivotal latch (26) is pivotally mounted between the sidewall (242) and the wing (243) and has an inside end (not numbered) and an outside end (not numbered). When the medial bracket (21) is fully extended, the inside end of the pivot latch (26) passes through the two through holes (241, 225) and engages the lock recess in the longitudinal arm (211). The release pedal device (34) that has a pedal (341) and a lever (342). The lever (342) has a proximal end (not numbered) and a distal end (not numbered), and the proximal end is pivotally attached to the bottom of the base disc (31). The pedal (341) is mounted in and through the base disc (31) and is connected to the lever (342) to pivot the pivot latch (26) when the pedal (341) is depressed. The connecting cord (25) has an upper end (not numbered) and a lower end (not numbered). The upper end is connected to the outside end of the pivot latch (26), and the lower end is connected to the distal end of the lever (342). When a person wants to retract the internal telescopic stand, the extension lock is released by pressing the pedal (341) to pivot the lever (342) that simultaneously pivots the pivotal latch (26) and disengages the inside end of the pivotal latch (26) from the lock recess in the longitudinal arm (211). The internal telescopic stand can then be retracted by pressing the top bracket (11) as previously described. With the inside end of the pivotal latch (26) engaged in the lock recess in the longitudinal arm (211), the internal telescopic stand will be held in an extended position.

The upper and lower telescopic tubes (13, 32) completely overlap when the internal telescopic stand is retracted so a minimum height is achieved. The minimum height assists in storing and transporting an inanimate object conveniently. Furthermore the extension lock allows the internal telescopic stand to securely hold a heavy inanimate object in an extended position.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An internal telescopic stand for inanimate objects, the internal telescopic stand comprising:
   a top bracket assembly comprising
      a top bracket with a top, a bottom, two opposite ends and two pivot slots defined from the top to the bottom respectively at the opposite ends of the top bracket; and
      two pivotal lock rods pivotally mounted respectively in the pivot slots, and each of the pivot lock rods having a bottom end and a latch formed at the bottom end;
   an upper spring-loaded telescopic tube assembly supporting the top bracket and having
      two upper telescopic tubes attached respectively to the bottom of the top bracket, each of the upper telescopic tubes being spring-loaded and having a top end and a bottom end, and the top ends of the upper telescopic tubes attached respectively to the bottom of the top bracket;
      two upper coil springs mounted respectively around the upper telescopic tubes; and
      two enlarged end caps mounted respectively on the bottom ends of the upper telescopic tubes;
   a medial bracket assembly connected to the upper spring-loaded telescopic tube assembly and comprising
      a medial bracket with two opposite sides having two longitudinal arms corresponding to the upper telescopic tubes, each longitudinal arm having a bottom end and an inner passage defined longitudinally within, and the bottoms end of the upper telescopic tubes with the enlarged end caps slidably mounted respectively in the inner passages; and
      two sliding locks respectively mounted on the longitudinal arms at the opposite sides of the medial bracket, each sliding lock having a top, a bottom, an outside side, a front, a rear, a locking arm formed in the outside side to form a latch slot and two through holes defined respectively at the front and the rear of the sliding lock;
   two lower spring-loaded telescopic tube assemblies supporting the medial bracket assembly and having
      four lower telescopic tubes aligned respectively with the through holes of the sliding locks, each lower telescopic tube being spring-loaded and having a top end and a bottom end, the top end of each lower telescopic tube passing through, extending out of and held securely in a corresponding one of the through holes in the sliding locks;
      four fastening plugs having enlarged heads pressed respectively onto the top ends of the lower telescopic tubes and into the corresponding through holes in the sliding lock; and
      four lower coil springs mounted respectively around the lower telescopic tubes below the sliding locks; and
   a base assembly supporting the lower spring-loaded telescopic tube assemblies and having
      a base disc with a top and a bottom supporting the lower spring-loaded telescopic tube assemblies with the bottom ends of the lower telescopic tubes mounted on the top of the base disc;
   wherein the internal telescopic stand is shortened with the latches of the pivot hook rods locked respectively in the latch slots in the sliding locks to keep the internal telescopic stand in a retracted position.

2. The internal telescopic stand as claimed in claim 1, wherein the medial bracket is U-shaped and further having
   an upper cross member having two ends;
   two longitudinal arms protruded respectively from the ends of the upper cross member corresponding to the two upper telescopic tubes; and
   a pair of lower sleeves attached to the bottom end of each longitudinal arm, and each lower sleeve aligned with a corresponding one of the through holes of the sliding locks;
   wherein the top end of each lower telescopic tube passes through and extends out of a corresponding one of the lower sleeves, and is securely held in a corresponding one of the through holes of the sliding locks by means of one of the fastening plugs.

3. The internal telescopic stand as claimed in claim 2, wherein the medial bracket further comprises
   two upper sleeves respectively mounted on the top cross member of the U-shaped medial bracket and respectively communicating with the inner passages of the longitudinal arms;
   wherein the bottom end of each upper telescopic tube passes through a corresponding one of the upper sleeves, extends out of the corresponding upper sleeve to be inside a corresponding one of the inner passages and is slidably held in the corresponding inner passage by means of one of the enlarged end caps.

4. The internal telescopic stand as claimed in claim 3, wherein the base assembly further comprises two pairs of mounting sleeves respectively formed on the top of the base disc and corresponding to the lower telescopic tubes, and the bottom end of each lower telescopic tube held in one of the corresponding mounting sleeves.

5. The internal telescopic stand as claimed in claim 4, wherein the top bracket further has two top end caps respectively formed from the top adjacent the opposite ends of the top bracket, each top end cap has an axial hole defined through the bottom of the top bracket to hold the top end of a corresponding one of the upper telescopic tubes.

6. The internal telescopic stand as claimed in claim 1, wherein one of the sliding locks further has a through hole transversally defined through the rear;

one of the longitudinal arms further has a lock recess defined in and corresponding to the through hole in the sliding lock;

an extension lock is mounted in the sliding lock with the through hole and has
- a latch bracket having a sidewall, a through hole aligned with the through hole in the sliding lock and a wing parallel to the sidewall; and
- a pivot latch pivotally mounted between the sidewall and the wing and having an inside end and an outside end, the inside end of the pivot latch passing through the two through holes in the sliding lock and the latch bracket and engaging the lock recess of the longitudinal arm when the medial bracket is fully extended to hold the internal telescopic stand in an extended position; and a release pedal device is mounted in the base disc and comprises
- a pedal mounted in and through the base disc;
- a lever corresponding and attached to the pedal and having a distal end and a proximal end pivotally attached to the bottom of the base disc; and
- a connecting cord having an upper end connected to the outside end of the pivot latch and a lower end connected to the distal end of the lever;

whereby the pedal is pushed to pivot the lever and simultaneously pivot the pivot latch so the inside end disengages from the lock recess in the longitudinal arm to allow the internal telescopic stand to be retracted.

7. The internal telescopic stand as claimed in claim 5, wherein one of the sliding locks further has a through hole transversally defined through the rear;

one of the longitudinal arms further has a lock recess defined in and corresponding to the through hole in the sliding lock;

an extension lock is mounted in the sliding lock with the through hole and has
- a latch bracket having a sidewall, a through hole aligned with the through hole in the sliding lock and a wing parallel to the sidewall; and
- a pivot latch pivotally mounted between the sidewall and the wing and having an inside end and an outside end, the inside end of the pivot latch passing through the two through holes in the sliding lock and the latch bracket and engaging the lock recess of the longitudinal arm when the medial bracket is fully extended to hold the internal telescopic stand in an extended position; and a release pedal device is mounted in the base disc and comprises
- a pedal mounted in and through the base disc;
- a lever corresponding and attached to the pedal and having a distal end and a proximal end pivotally attached to the bottom of the base disc; and
- a connecting cord having an upper end connected to the outside end of the pivot latch and a lower end connected to the distal end of the lever;

whereby the pedal is pushed to pivot the lever and simultaneously pivot the pivot latch so the inside end disengages from the lock recess in the longitudinal arm to allow the internal telescopic stand to be retracted.

* * * * *